(12) United States Patent
Mao et al.

(10) Patent No.: US 10,601,354 B2
(45) Date of Patent: Mar. 24, 2020

(54) METHOD AND APPARATUS FOR ON-LINE ESTIMATION OF INITIAL POSITION OF SURFACE PERMANENT MAGNET ELECTRIC MACHINE

(71) Applicants: Yongle Mao, Hangzhou (CN); Wei Zhang, Hangzhou (CN); Xiaoyun Zang, Shanghai (CN); Robert Bosch GmbH, Stuttgart (DE)

(72) Inventors: Yongle Mao, Hangzhou (CN); Wei Zhang, Hangzhou (CN); Xiaoyun Zang, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/065,836

(22) PCT Filed: Dec. 23, 2015

(86) PCT No.: PCT/CN2015/098458
§ 371 (c)(1),
(2) Date: Jun. 25, 2018

(87) PCT Pub. No.: WO2017/107105
PCT Pub. Date: Jun. 29, 2017

(65) Prior Publication Data
US 2018/0375453 A1 Dec. 27, 2018

(51) Int. Cl.
*H02P 21/00* (2016.01)
*H02P 21/18* (2016.01)
(Continued)

(52) U.S. Cl.
CPC ............. *H02P 21/18* (2016.02); *H02P 21/06* (2013.01); *H02P 21/14* (2013.01); *H02P 21/34* (2016.02); *H02P 2207/05* (2013.01)

(58) Field of Classification Search
CPC ...... H02P 21/06; H02P 21/14; H02P 2207/05; H02P 21/18
See application file for complete search history.

(56) References Cited

U.S. PATENT DOCUMENTS

2015/0042249 A1* 2/2015 Lin .................. H02P 6/183
318/400.02
2018/0278189 A1* 9/2018 Zang ................ B62D 5/046

FOREIGN PATENT DOCUMENTS

CN 101340169 A 1/2009
CN 103501151 A 1/2014
(Continued)

OTHER PUBLICATIONS

Huh K-K et al: "A Novel Method for initial Rotor Position Estimation for IPM Synchronous Machine Drives", IEEE Transactions on Industry Applications, IEE Service Center, Piscataway, NJ, US, vol. 40, No. 5, Sep. 1, 2004, pp. 1369-1378.
(Continued)

*Primary Examiner* — Karen Masih
(74) *Attorney, Agent, or Firm* — Michael Best & Friedrich LLP

(57) ABSTRACT

The present invention relates to a method and apparatus for on-line estimation of an initial position of a surface permanent magnet electric machine in a stationary state or at a first speed. The method (100) for on-line estimation of an initial position of a surface permanent magnet electric machine in a stationary state or at a first speed comprises: injecting a high-frequency pulsating voltage signal; acquiring a d-axis high-frequency current signal responding to the high-frequency pulsating voltage signal; and estimating an initial position of the surface permanent magnet electric machine on the basis of a second harmonic of the d-axis high-frequency current signal. According to the present invention, the apparatus (200) for on-line estimation of an initial
(Continued)

position of a surface permanent magnet electric machine in a stationary state or at a first speed is also provided, the apparatus comprising a voltage injection unit configured to inject a high-frequency pulsating voltage signal, a current acquisition unit configured to acquire a d-axis high-frequency current signal responding to the high-frequency pulsating voltage signal, and an analysis unit configured to analyse a second harmonic of the d-axis high-frequency current signal so as to estimate an initial position of the surface permanent magnet electric machine.

7 Claims, 2 Drawing Sheets

(51) Int. Cl.
*H02P 21/14* (2016.01)
*H02P 21/34* (2016.01)
*H02P 21/06* (2016.01)

(56) References Cited

FOREIGN PATENT DOCUMENTS

| | | |
|---|---|---|
| CN | 103780193 A | 5/2014 |
| CN | 103986395 A | 8/2014 |
| CN | 104660140 A | 5/2015 |
| EP | 2061147 A2 | 5/2009 |
| JP | 2001211039 A | 8/2001 |
| JP | 2011030349 A | 2/2011 |

OTHER PUBLICATIONS

Lin T C et al: "Sensorless Operation Capability of Surface-Mounted Permanent-Magnet Machine Based on High-Frequency Signal Injection Methods", IEEE Transactions on Industry Applications, IEEE Service Center, Piscataway, NJ, US, vol. 51, No. 3, May 1, 2015, pp. 2161-2171.

Liu Bing et al: "A rotor initial position estimation method for sensorless control of SPMSM", IECON 2014—40th Annual Conference of the IEEE Industrial Electronics Society, IEEE, Oct. 29, 2014, pp. 354-359.

Zhaobin Huang et al: "Sensorless initial rotor position identification for non-salient permanent magnet synchronous motors based on dynamic reluctance difference", IET Power Electro, IET, UK, vol. 7, No. 9, Sep. 1, 2014, pp. 2336-2346.

International Search Report and Written Opinion with English translation for Application No. PCT/CN2015/098458 dated Sep. 23, 2016 (16 pages).

Liu Bing et al, "A rotor initial position estimation method for sensorless control of SPMSM", IECON 2014 40TH Annual Conference of the Industrial Electronics Society IEEE, China, IEEE, Oct. 29, 2014, 29, 354, and 359.

* cited by examiner

METHOD AND APPARATUS FOR ON-LINE ESTIMATION OF INITIAL POSITION OF SURFACE PERMANENT MAGNET ELECTRIC MACHINE

BACKGROUND OF THE INVENTION

The embodiments of the present invention relate to the field of surface permanent magnet electric machine control, in particular to a method for on-line estimation of an initial position of a surface permanent magnet electric machine in a stationary state or at a first speed, and an apparatus for on-line estimation of an initial position of a surface permanent magnet electric machine in a stationary state or at a first speed.

To drive a surface permanent magnet synchronous electric machine (SPMSM/SPM: Surface Permanent Magnet Synchronous Motor), it is necessary to acquire rotor position in order to realize vector control (FOC: Field Oriented Control). Without a rotor position sensor, rotor position can be estimated by extracting position information from measured phase currents. When the synchronous electric machine is operating at zero speed or at a low speed (generally 10% of the rated speed), the back emf is very small because the speed is also very small. In such a situation, a method of High Frequency Pulsating Voltage Injection (HFPVI) is generally used to extract rotor position information.

In principle, the HFPVI method only tracks the position of a rotor salient pole; this position does not include rotor position polarity. If the estimated rotor position polarity is not accurate, then electromagnetic torque will be opposite to reference torque, and this will lead to failure of pole control. A prior method for estimating rotor position polarity is to inject voltage pulses from positive and negative directions of the d-axis respectively and determine rotor polarity according to a measured current amplitude difference. However, the method requires the injection of voltage signals at least twice, and a long time (of the order of hundreds of milliseconds) must be consumed before rotor polarity is determined; moreover, the method must determine rotor polarity when the pole is in a stationary state. Thus, such a method is an off-line method, and so cannot be used for starting an electric machine having a certain initial speed.

SUMMARY OF THE INVENTION

In order to realize on-line rotor position determination, in particular rotor position determination of an electric machine having a certain speed, an innovative method is provided according to the present invention; the method is an on-line method, and can be used on an electric machine that is started at zero speed or a low first speed. The method is realized on the basis of a second harmonic of a high-frequency current on a d-axis. The method can compensate for the effects of stator impedance and PWM delay, and can thereby maximize rotor position error carrier current and the signal-to-noise ratio of the rotor position carrier current. Thus, the precision of rotor position estimation when in a stationary state or a low-speed state can be improved.

According to the present invention, a method for on-line estimation of an initial position of a surface permanent magnet electric machine in a stationary state or at a first speed is proposed, the method comprising:

injecting a high-frequency pulsating voltage signal;

acquiring a d-axis high-frequency current signal responding to the high-frequency pulsating voltage signal; and estimating an initial position of the surface permanent magnet electric machine on the basis of a second harmonic of the d-axis high-frequency current signal.

According to the present invention, innovative use is made of the second harmonic of the d-axis high-frequency current signal to estimate the initial position of the surface permanent magnet electric machine, so that the initial position of the surface permanent magnet electric machine can be estimated accurately even in cases where the surface permanent magnet electric machine has a certain initial speed, e.g. the first speed, thereby realizing on-line estimation of the initial position of the surface permanent magnet electric machine.

In one embodiment of the present invention, the high-frequency pulsating voltage signal is subjected to phase compensation, in order to compensate for stator impedance and pulse width modulation delay. Through such phase compensation, the stator impedance and pulse width modulation delay can be compensated for, and the accuracy of the estimated initial position of the surface permanent magnet electric machine can thereby be increased.

In one embodiment of the present invention, the first speed does not exceed 10% of a rated rotation speed of the surface permanent magnet electric machine.

In one embodiment of the present invention, the initial position comprises a rotor salient pole position and a rotor position polarity. In this way, the method according to the present invention can realize estimation of an initial position, which includes a rotor salient pole position and a rotor position polarity, by injecting just one single high-frequency pulsating voltage signal, so can not only reduce the time taken to estimate initial position and improve system performance, but can also additionally acquire rotor position polarity information, thereby providing necessary and useful information for subsequent vector control.

In one embodiment of the present invention, the step of estimating an initial position of the surface permanent magnet electric machine on the basis of a second harmonic of the d-axis high-frequency current signal further comprises:

converting the d-axis high-frequency current signal to a d-q coordinate system so as to obtain a first component and a second component;

subjecting the first component to band-pass filtering, sine processing, low-pass filtering, and observation using a Luenberger observer or phase-locked loop circuit, so as to obtain a rotor salient pole position of the surface permanent magnet electric machine; and subjecting the second component to band-pass filtering, cosine processing, low-pass filtering and polarity determination so as to obtain a rotor position polarity of the surface permanent magnet electric machine.

Those skilled in the art should understand that the method according to the present invention comprises but is not limited to the above processing steps, and the estimation of the initial position of the surface permanent magnet electric machine by means of the the second harmonic of the d-axis high-frequency current signal could also be realized by other suitable technical means.

In addition, according to the present invention, an apparatus for on-line estimation of an initial position of a surface permanent magnet electric machine in a stationary state or at a first speed is also provided, the apparatus comprising:

a voltage injection unit, configured to inject a high-frequency pulsating voltage signal;

a current acquisition unit, configured to acquire a d-axis high-frequency current signal responding to the high-frequency pulsating voltage signal; and an analysis unit, configured to analyse a second harmonic of the d-axis high-frequency current signal, so as to estimate an initial position of the surface permanent magnet electric machine.

In one embodiment of the present invention, the voltage injection unit is further configured to subject the high-frequency pulsating voltage signal to phase compensation, in order to compensate for stator impedance and pulse width modulation delay.

In one embodiment of the present invention, the first speed does not exceed 10% of a rated rotation speed of the surface permanent magnet electric machine.

In one embodiment of the present invention, the initial position comprises a rotor salient pole position and a rotor position polarity.

In one embodiment of the present invention, the analysis unit further comprises:

a coordinate system conversion unit, configured to convert the d-axis high-frequency current signal to a d-q coordinate system so as to obtain a first component and a second component;

a first processing unit, comprising a first band-pass filter, a sine processing unit, a first low-pass filter and a Luenberger observer or phase-locked loop circuit, and being configured to subject the first component to band-pass filtering, sine processing, low-pass filtering, and observation using the Luenberger observer or phase-locked loop circuit, so as to obtain a rotor salient pole position of the surface permanent magnet electric machine; and a second processing unit, comprising a second band-pass filter, a cosine processing unit, a second low-pass filter and a polarity determination circuit, and being configured to subject the second component to band-pass filtering, cosine processing, low-pass filtering and polarity determination so as to obtain a rotor position polarity of the surface permanent magnet electric machine.

In one embodiment of the present invention, the second low-pass filter is a self-adaptive filter with zero delay, in order to compensate for a phase shift introduced by the second low-pass filter.

Compared with an existing method, the method of the present invention mainly has the following advantages:

First of all, the method realizes on-line rotor position polarity determination, and can realize rotor position polarity determination when starting is performed at a low speed, so has a significant comparative advantage over an off-line method in the prior art which can only be used when the rotor is in a stationary state.

Secondly, compared with a conventional off-line method, the method of the present invention can shorten the time taken to determine rotor position; the time needed in the method is only about 20 to 40 milliseconds, and can at the same time compensate for stator impedance and PWM delay, and thereby improve the precision of rotor position estimation.

BRIEF DESCRIPTION OF THE DRAWINGS

The following detailed description of non-limiting embodiments with reference to the accompanying drawings will make other features, objectives and advantages of the present invention more obvious.

Figure 1:
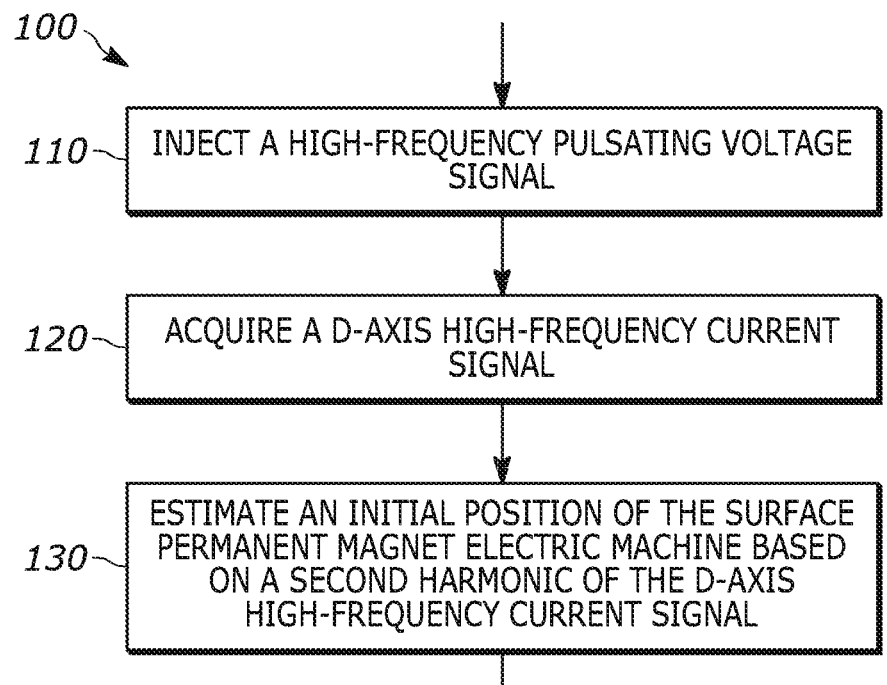
FIG. 1 shows schematically a flow chart of a method 100 according to the present invention for on-line estimation of an initial position of a surface permanent magnet electric machine in a stationary state or at a first speed.

Throughout the figures, identical or similar reference labels represent identical or similar apparatuses (modules) or steps.

DETAILED DESCRIPTION

In the specific description of the preferred embodiments below, reference will be made to the accompanying drawings, which form part of the present invention. The accompanying drawings show, by means of demonstration, specific embodiments capable of realizing the present invention. The demonstrative embodiments are not intended to exhaust all the embodiments according to the present invention. It can be understood that other embodiments may be utilized on condition that the scope of the present invention is not departed from, and structural or logical amendments may be made. Thus, the following specific description is not limiting, and the scope of the present invention is defined by the attached claims.

In theory, the relationship between d-axis magnetic flux and d-axis current is as follows: when the d-axis current is positive, the d-axis armature reaction magnetic flux is in the same direction as the permanent magnet magnetic flux, and this will cause further saturation of the d-axis magnetic circuit, and cause the d-axis inductance to fall; correspondingly, when the d-axis current is negative, the d-axis armature reaction magnetic flux is in the opposite direction to the permanent magnet magnetic flux, and this will cause the saturation level of the d-axis magnetic circuit to drop, and cause the d-axis inductance to rise. The N pole and S pole of the rotor can thus be distinguished via the above inductance saturation effect.

It can be seen from the above discussion that the d-axis current is a function of the d-axis magnetic flux, and a second-order Taylor series obtained by omitting a Lagrange remainder from the function at the position $(\psi_m, 0)$ is as follows:

$$i_d(\psi_d) = R_{d0}(\psi_d - \psi_m) + R'_d(\psi_d - \psi_m)^2 + R''_d(\psi_d - \psi_m)^3 \quad (1)$$

where $R_{d0} = \frac{1}{L_{d0}}$, $R'_d = \frac{di_d}{d\psi_d}\bigg|_{\psi_d=\psi_m}$, and $R''_d = \frac{d^2 i_d}{d\psi_d^2}\bigg|_{\psi_d=\psi_m}$.

If the following high-frequency pulsating voltage signal is injected in an estimated d-q coordinate system:

$$v_{\hat{d}\hat{q}h} = V_c \begin{pmatrix} \cos \omega_c t \\ 0 \end{pmatrix} \quad (2)$$

then, taking into account stator impedance and PWM delay, a high-frequency response current can be expressed as:

$$\hat{i}_{\hat{d}\hat{q}h} = \frac{-V_c \cos(\omega_c t + \phi_1 + \phi_2 + \phi_3)}{|z_{dh0}| |z_{qh0}|} (z_{avg} + z_{diff} e^{j2\hat{\theta}_e}) + \quad (3)$$

$$\frac{V_c^2}{2} \frac{R'_{dh} L^2_{dh0}}{|z_{db0}|^2} \sin^2(\omega_c t + \phi_1 + \phi_3)\cos^2(\tilde{\theta}_e)e^{j\tilde{\theta}_e}$$

where $z_{dh}=R_s+j\omega_h L_d$, $z_{qh}=R_s+j\omega_h L_q$, and $\phi_1=\arctan(R_s/\omega_h L_d)$, $\phi_2=\arctan(R_s/\omega_h L_q)$, $\phi_3$ is phase shift caused by PWM delay.

Rotor salient pole position can be extracted by means of the first term in formula (3) above, and the following information can be extracted from the second term in formula (3): whether the rotor position is tending towards the N pole or the S pole. The specific extraction method will be described in detail in the next section.

The following rotor position error signal can be obtained by a corresponding method:

$$\varepsilon_\theta = \frac{V_c \cos(\phi_1 + \phi_2 + \phi_3)}{|z_{dh0}||z_{qh0}|}(\omega_h L_{diff} \sin 2\tilde{\theta}_e) \qquad (4)$$

$$= |\varepsilon_\theta|_{max} \cos(\phi_1 + \phi_2 + \phi_3)\sin 2\tilde{\theta}_e$$

where $|\varepsilon_\theta|_{max} = \frac{V_c \omega_h L_{diff}}{|z_{dh0}||z_{qh0}|}$.

A rotor position polarity error signal is:

$$\varepsilon_{pol} = -\frac{V_c^2}{4} \frac{R'_{dh} L^2_{dh0}}{|z_{dh0}|^2} \cos(2\phi_1 + \phi_3)\cos^2(\tilde{\theta}_e)\cos(\tilde{\theta}_e) \qquad (5)$$

If a rotor position estimation error is $\delta\theta_e$ or $\delta\theta_e+\pi$, then a polarity carrier signal amplitude is:

$$|\varepsilon_{pol}| = \frac{V_c^2}{4} \frac{R'_{dh} L^2_{dh0}}{|z_{db0}|^2} \cos(2\phi_1 + \phi_3)\cos^3 \delta\theta_e \qquad (6)$$

$$= |\varepsilon_{pol}|_{max} \cos(2\phi_1 + \phi_3)\cos^3 \delta\theta_e$$

where $|\varepsilon_{pol}|_{max} = \frac{V_c^2}{4} \frac{R'_{dh} L^2_{dh0}}{|z_{dh0}|^2}$.

It can be seen from formulae (4) and (6) above that an initial position of a surface permanent magnet electric machine can be estimated by the method according to the present invention for on-line estimation of an initial position of a surface permanent magnet electric machine in a stationary state or at a first speed; specifically, FIG. 1 shows a flow chart 100 of a method for on-line estimation of an initial position of a surface permanent magnet electric machine in a stationary state or at a first speed, and it can be seen from FIG. 1 that the method comprises the following steps:

First of all, a high-frequency pulsating voltage signal will be injected in step 110;

then, in the next step 120, a d-axis high-frequency current signal responding to the high-frequency pulsating voltage signal will be acquired; and finally, in step 130, an initial position of the surface permanent magnet electric machine is estimated on the basis of a second harmonic of the d-axis high-frequency current signal.

Optionally or additionally, the first speed does not exceed 10% of a rated rotation speed of the surface permanent magnet electric machine.

In the above formulation, the initial position may comprise a rotor salient pole position and a rotor position polarity. In this way, the method according to the present invention can realize estimation of an initial position, which includes a rotor salient pole position and a rotor position polarity, by injecting just one single high-frequency pulsating voltage signal, so can not only reduce the time taken to estimate initial position and improve system performance, but can also additionally acquire rotor position polarity information, thereby providing necessary and useful information for subsequent vector control.

Step 130 above, in which an initial position of the surface permanent magnet electric machine is estimated on the basis of a second harmonic of the d-axis high-frequency current signal, may further comprise:

converting the d-axis high-frequency current signal to a d-q coordinate system so as to obtain a first component and a second component;

subjecting the first component to band-pass filtering, sine processing, low-pass filtering and observation using a Luenberger observer LO or phase-locked loop circuit so as to obtain a rotor salient pole position of the surface permanent magnet electric machine; and subjecting the second component to band-pass filtering, cosine processing, low-pass filtering and polarity determination so as to obtain a rotor position polarity of the surface permanent magnet electric machine.

Figure 2:
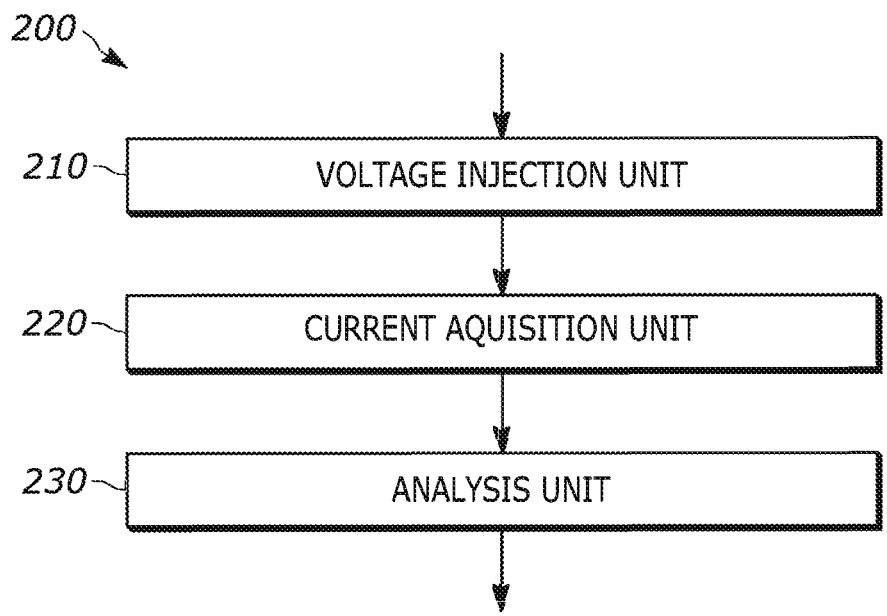
FIG. 2 shows schematically a block diagram of an apparatus 200 according to the present invention for on-line estimation of an initial position of a surface permanent magnet electric machine in a stationary state or at a first speed.
Figure 3:
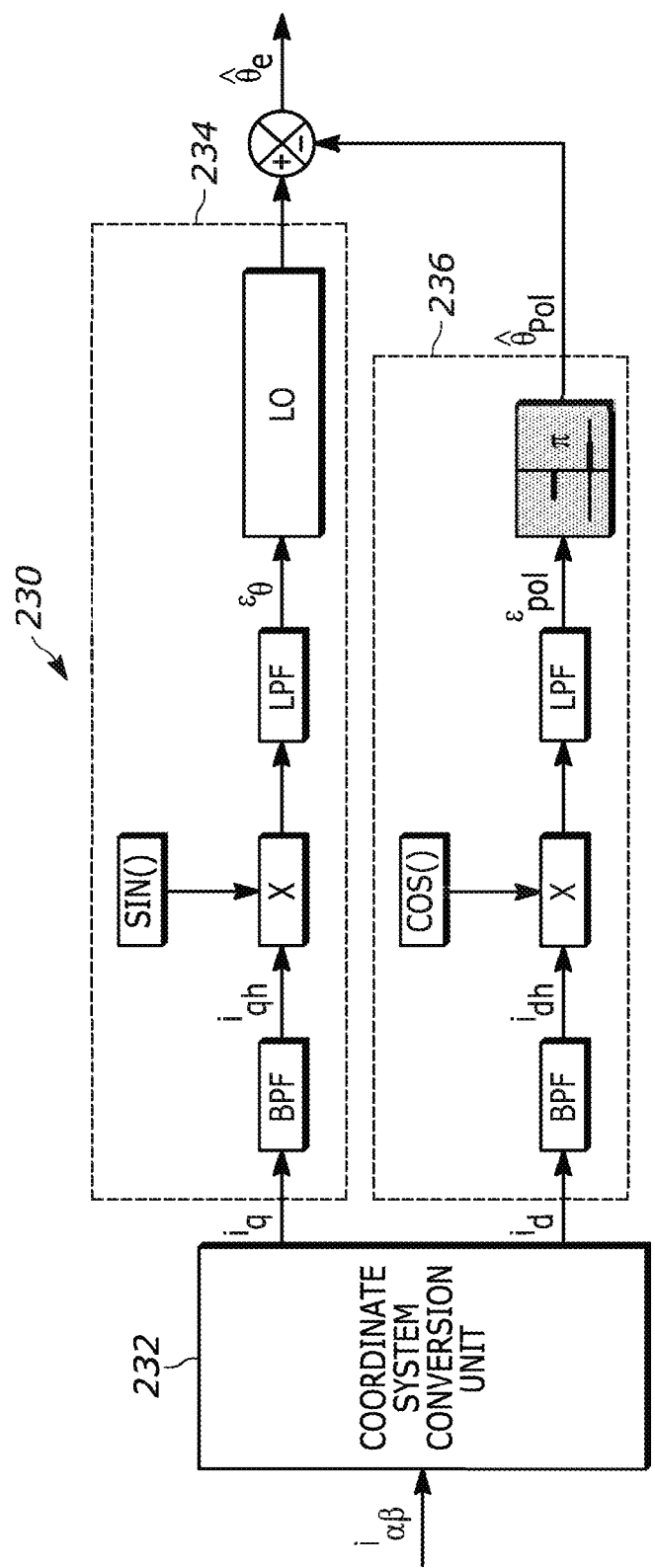
FIG. 3 shows schematically a block diagram of an analysis unit 230 according to the present invention.

Implementation steps of the method according to the present invention will now be further expounded with reference to the apparatus block diagram 200 of FIG. 2 and the detailed block diagram 300 of the relevant analysis apparatus of FIG. 3.

Specifically, FIG. 2 shows a block diagram of an apparatus 200 according to the present invention for on-line estimation of an initial position of a surface permanent magnet electric machine in a stationary state or at a first speed, and FIG. 3 shows a block diagram of an analysis unit 230 according to the present invention.

It can be seen from FIG. 2 that the apparatus 200 according to the present invention for on-line estimation of an initial position of a surface permanent magnet electric machine in a stationary state or at a first speed comprises the following parts:

a voltage injection unit 210, configured to inject a high-frequency pulsating voltage signal;

a current acquisition unit 220, configured to acquire a d-axis high-frequency current signal responding to the high-frequency pulsating voltage signal; and an analysis unit 230, configured to analyse a second harmonic of the d-axis high-frequency current signal, so as to estimate an initial position of the surface permanent magnet electric machine.

Optionally or additionally, the first speed does not exceed 10% of a rated rotation speed of the surface permanent magnet electric machine. In one embodiment of the present invention, the initial position comprises a rotor salient pole position and a rotor position polarity.

More specifically, the analysis unit 230 further comprises:

a coordinate system conversion unit 232, configured to convert the d-axis high-frequency current signal to a d-q coordinate system so as to obtain a first component and a second component;

a first processing unit 234, comprising a first band-pass filter, a sine processing unit, a first low-pass filter and a Luenberger observer or phase-locked loop circuit, and being configured to subject the first component to band-pass filtering, sine processing, low-pass filtering, and observation using the Luenberger observer or phase-locked loop circuit, so as to obtain a rotor salient pole position of the surface permanent magnet electric machine; and a second processing unit 236, comprising a second band-pass filter, a cosine processing unit, a second low-pass filter and a polarity determination circuit, and being configured to subject the second component to band-pass filtering, cosine processing, low-pass filtering and polarity determination so as to obtain a rotor position polarity of the surface permanent magnet electric machine. Preferably, the second low-pass filter is a self-adaptive filter with zero delay, in order to compensate for a phase shift introduced by the second low-pass filter.

However, the stator impedance and PWM delay (expressed as $\phi_1$ and $\phi_3$ respectively in formulae (4) and (6)) will reduce position error amplitude and polarity carrier signal amplitude, and thereby reduce the signal-to-noise ratio. In order to maximize the signal-to-noise ratio of a position carrier signal and a polarity carrier signal, it is necessary to compensate for the stator impedance and PWM delay. Preferably, the high-frequency pulsating voltage signal may be subjected to phase compensation, in order to compensate for stator impedance and pulse width modulation delay. Then the injected high-frequency pulsating voltage signal should be:

$$v_{\hat{d}\hat{q}h} = V_c \begin{pmatrix} \cos(\omega_c t - \phi_1 - \phi_2 - \phi_3) \\ 0 \end{pmatrix} \quad (7)$$

As a result of the injected high-frequency pulsating voltage signal being subjected to phase compensation, the position error amplitude and polarity carrier signal amplitude obtained should correspondingly be:

$$\varepsilon_\theta = \frac{V_c}{|z_{dh0}||z_{qh0}|}(\omega_h L_{diff} \sin 2\tilde{\theta}_e) = |\varepsilon_\theta|_{max} \sin 2\tilde{\theta}_e \quad (8)$$

$$\text{and} \quad |\varepsilon_{pol}| = \frac{V_c^2}{4} \frac{R'_{dh} L^2_{dh0}}{|z_{dh0}|^2} \cos^3 \delta\theta'_e \approx |\varepsilon_{pol}|_{max} \quad (9)$$

It can be seen from formulae (8) and (9) above that the stator impedance and PWM delay ($\phi_1$ and $\phi_3$) have both already been eliminated in the position error amplitude and polarity carrier signal amplitude above. Thus, the rotor position estimation error $\delta\theta'_e$ substantially tends towards zero, and the signal-to-noise ratio of the rotor position carrier signal is maximized. In other words, through such phase compensation, the stator impedance and pulse width modulation delay can be compensated for, and the accuracy of the estimated initial position of the surface permanent magnet electric machine can thereby be increased.

To those skilled in the art, the present invention is obviously not limited to the details of the demonstrative embodiments above, and could be realized in another specific form without departing from the spirit or basic features of the present invention. Thus, the embodiments should in all circumstances be regarded as demonstrative and non-limiting. Furthermore, obviously, the word "comprise" does not exclude other elements and steps, and the wording "a" does not exclude a plurality. Multiple elements stated in apparatus claims may also be realized by one element. Terms such as first and second are used to indicate designations, and do not indicate any specific order.

The invention claimed is:

1. A method (100) for on-line estimation of an initial position of a surface permanent magnet electric machine in a stationary state or at a first speed, the method (100) comprising:
   injecting (110) a high-frequency pulsating voltage signal;
   acquiring (120) a d-axis high-frequency current signal responding to the high-frequency pulsating voltage signal; and
   estimating (130) an initial position of the surface permanent magnet electric machine on the basis of a second harmonic of the d-axis high-frequency current signal wherein the initial position comprises a rotor salient pole position and a rotor position polarity, and wherein the step of estimating (130) an initial position of the surface permanent magnet electric machine on the basis of a second harmonic of the d-axis high-frequency current signal further comprises:
   converting the d-axis high-frequency current signal to a d-q coordinate system so as to obtain a first component ($i_q$) and a second component ($i_d$);
   subjecting the first component ($i_q$) to band-pass filtering, sine processing, low-pass filtering, and observation using a Luenberer observer or phase-locked loop circuit, so as to obtain a rotor salient pole position of the surface permanent magnet electric machine; and
   subjecting the second component ($i_d$) to band-pass filtering, cosine processing, low-pass filtering and polarity determination so as to obtain a rotor position polarity of the surface permanent magnet electric machine.

2. The method according to claim 1, wherein the high-frequency pulsating voltage signal is subjected to phase compensation, in order to compensate for stator impedance and pulse width modulation delay.

3. The method according to claim 1, wherein the first speed does not exceed 10% of a rated rotation speed of the surface permanent magnet electric machine.

4. An apparatus (200) for on-line estimation of an initial position of a surface permanent magnet electric machine in a stationary state or at a first speed, the apparatus (200) comprising:
   a voltage injector (210), configured to inject a high-frequency pulsating voltage signal;
   a current acquirer (220), configured to acquire a d-axis high-frequency current signal responding to the high-frequency pulsating voltage signal; and
   an analyzer (230), configured to analyse a second harmonic of the d-axis high-frequency current signal, so as to estimate an initial position of the surface permanent magnet electric machine, wherein the initial position comprises a rotor salient pole position and a rotor position polarity, wherein the analyzer (230) further comprises:
   a coordinate system converter (232), configured to convert the d-axis high-frequency current signal to a d-q coordinate system so as to obtain a first component ($i_q$) and a second component ($i_d$);
   a first processor (234), comprising a first band-pass filter, a sine processing unit, a first low-pass filter and a Luenberger observer or phase-locked loop circuit, and being configured to subject the first component ($i_q$) to band-pass filtering, sine processing, low-pass filtering, and observation using the Luenberger observer or phase-locked loop circuit, so as to obtain a rotor salient Dole position of the surface permanent magnet electric machine; and
   a second processor (236), comprising a second band-pass filter, a cosine processing unit, a second low-pass filter and a polarity determination circuit, and being configured to subject the second component ($i_d$) to band-pass filtering, cosine processing, low-pass filtering and polarity determination so as to obtain a rotor position polarity of the surface permanent magnet electric machine.

5. The apparatus (200) according to claim 4, wherein the voltage injector is further configured to subject the high-frequency pulsating voltage signal to phase compensation, in order to compensate for stator impedance and pulse width modulation delay.

6. The apparatus (200) according to claim 4, wherein the first speed does not exceed 10% of a rated rotation speed of the surface permanent magnet electric machine.

7. The apparatus according to claim 4, wherein the second low-pass filter is a self-adaptive filter with zero delay.

\* \* \* \* \*